July 3, 1945.  F. B. HUNTER  2,379,579
LUBRICANT CIRCULATING SYSTEM
Filed May 25, 1942  3 Sheets-Sheet 1
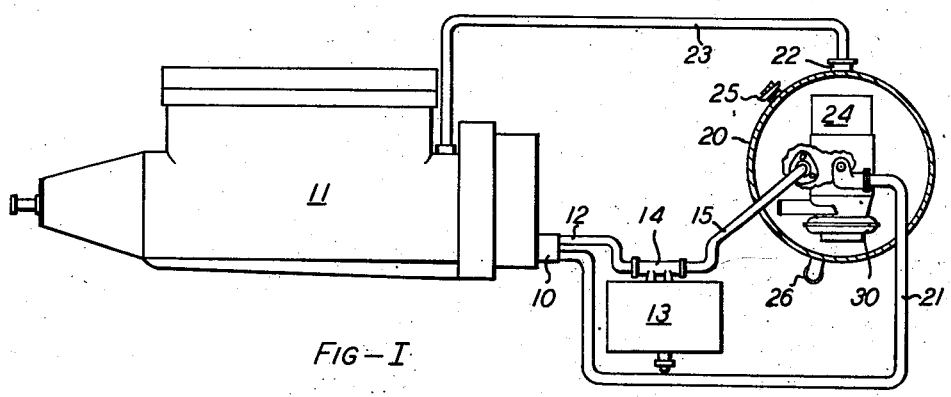
FIG-I
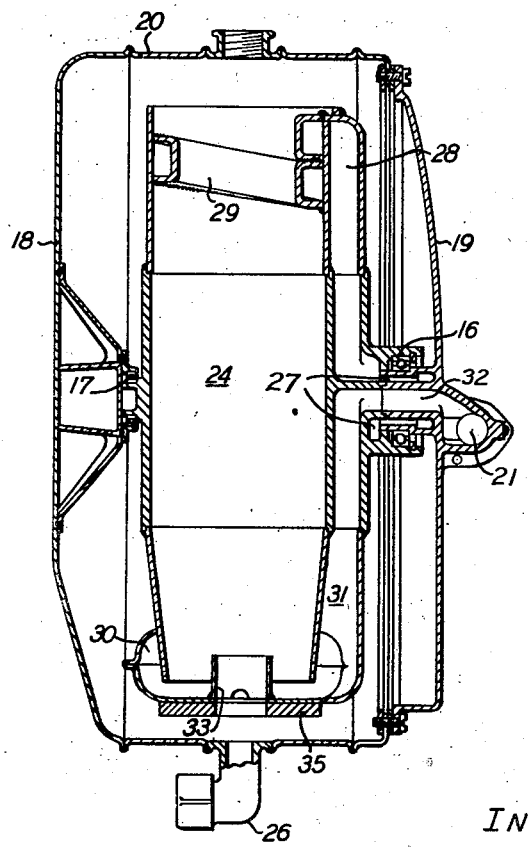
FIG-II
INVENTOR
FRANK B. HUNTER
BY George C. Sullivan July 3, 1945.   F. B. HUNTER   2,379,579
LUBRICANT CIRCULATING SYSTEM
Filed May 25, 1942   3 Sheets-Sheet 2
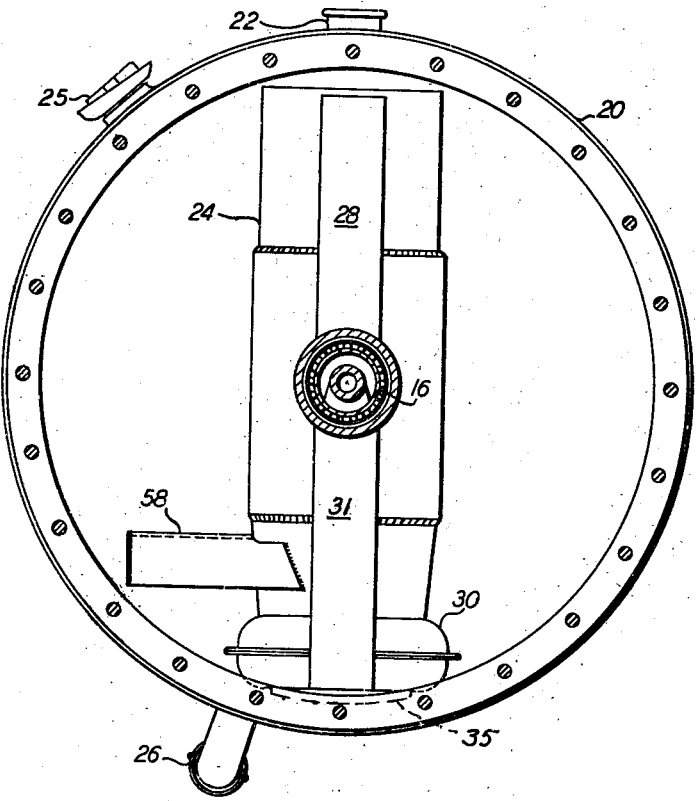
FIG-III
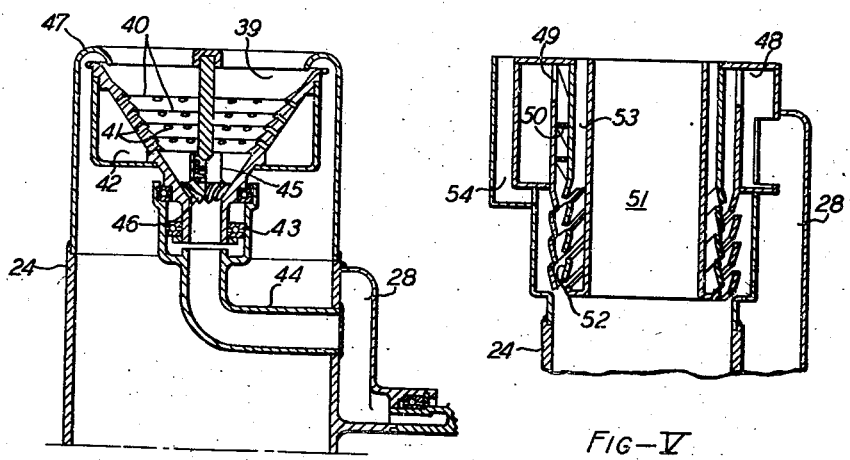
FIG-IV   FIG-V
INVENTOR
FRANK B. HUNTER
BY George C. Sullivan July 3, 1945.   F. B. HUNTER   2,379,579
LUBRICANT CIRCULATING SYSTEM
Filed May 25, 1942   3 Sheets-Sheet 3
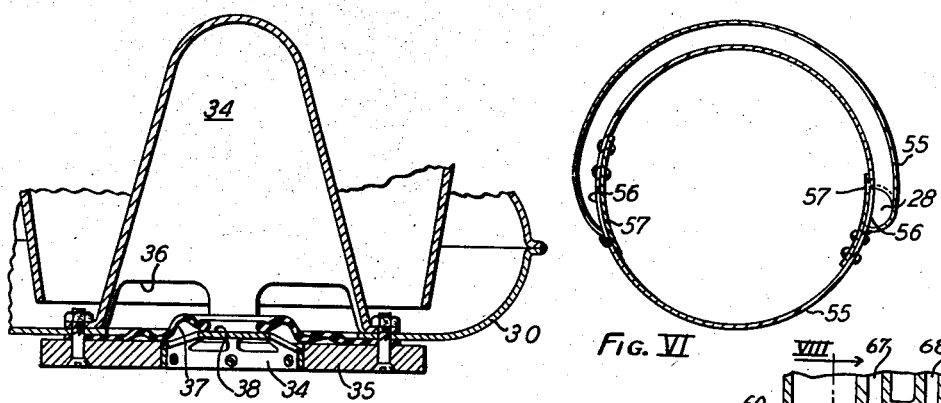
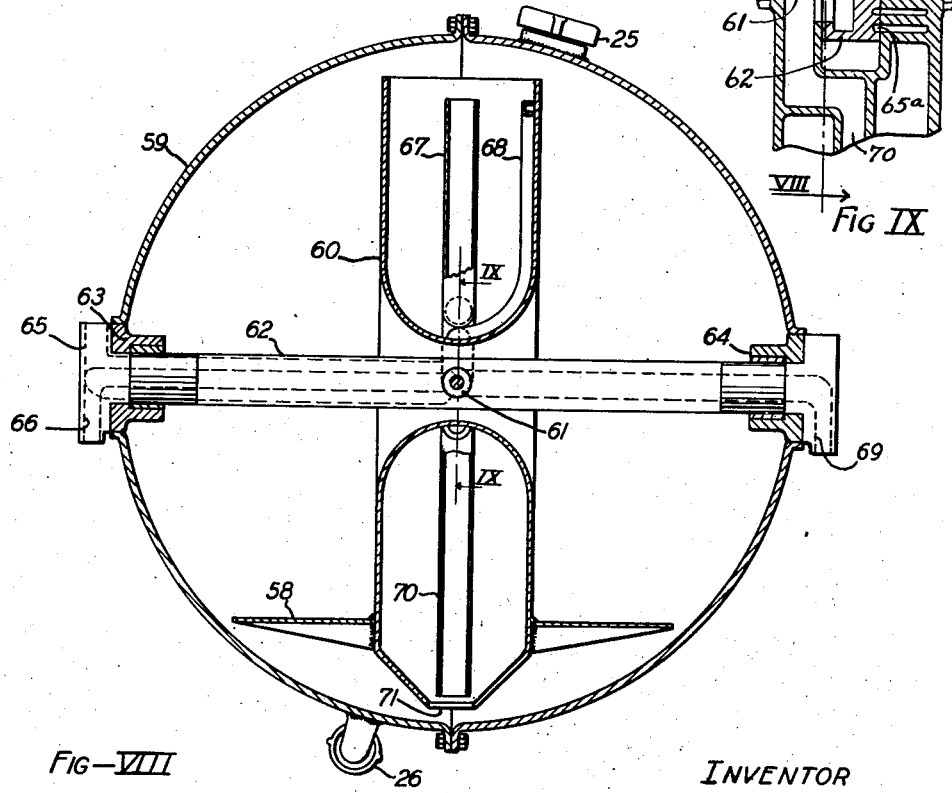
INVENTOR
FRANK B. HUNTER
BY George C. Sullivan Patented July 3, 1945

2,379,579

UNITED STATES PATENT OFFICE 2,379,579

LUBRICANT CIRCULATING SYSTEM

Frank B. Hunter, La Canada, Calif., assignor to Lockheed Aircraft Corporation, Burbank, Calif.

Application May 25, 1942, Serial No. 444,311

18 Claims. (Cl. 184—6)

This invention relates to an improved form of lubricating tank or reservoir embodying provisions for proper lubricant supply to an aircraft engine during various attitudes of flight involved in acrobatic or fighting maneuvers of the airplane driven thereby.

Such maneuvers include steep climbs and dives, upside down flying, and steeply banked turns, wherein the lubricant in the reservoir is thrown around by gravity or centrifugal force, rendering it difficult to assure continuous submergence of the suction or draw-off connection leading to the engine, failure of the oil supply to the engine resulting in immediate danger of damage or wrecking thereof. A desirable range of flight attitudes, in addition to inverted flight, as called for by Army specifications, includes 20° incline, 90° dive and 60° climb, including 15° incline in the dive and climb positions. The tank of the present invention is not limited to such restrictions in operation as it is unaffected by the longitudinal attitude of the airplane and is so shaped as to eliminate unusable oil pockets when the airplane is banked for a turn or roll. Thus, the engine is assured of a continuous oil supply throughout all possible maneuvers even though the reserve oil has been nearly exhausted.

It is accordingly an object of this invention to provide a lubricant or fluid supply tank for airplanes arranged to maintain a continuous flow of fluid regardless of the attitude or maneuvering of the airplane.

It is a further object of this invention to provide a lubricating supply tank of the type described embodying a hopper for recirculating the engine oil, the hopper being arranged to isolate the reserve oil from the circulating oil, except for the supply of makeup oil to the circulating oil.

It is also an object of this invention to provide a fluid circulating tank of the class described wherein a pivoted hopper serves to de-aerate and recirculate the fluid, while drawing makeup fluid from the reserve provided in the tank, the pivoted hopper responding to gravity and/or centrifugal forces to maintain the makeup entry point below the level of the reserve fluid in said tank.

Other and further important objects of this invention will be apparent from the disclosures in the specification and the accompanying drawings.

A preferred embodiment of the invention, together with variations thereof, are shown in the accompanying drawings wherein—

Fig. I is a diagrammatic showing of an aircraft engine lubricating system embodying the features of this invention.

Fig. II is an enlarged vertical transverse section of the lubricant tank of Fig. I.

Fig. III is a side view of the tank of Fig. I with the cover removed to show the pivoted hopper in elevation.

Fig. IV is a fragmentary section of a modified form of hopper construction intended to assist in separation of the entrained air in the return flow of fluid.

Fig. V is a fragmentary hopper section embodying another air separating arrangement.

Fig. VI is a section through a modified form of hopper adjacent the oil outlet thereto, showing means to control the flow of oil to maintain the centrifugal effect at partial volume of flow.

Fig. VII is a fragmentary section of a modified form of hopper sump embodying a check valve to prevent counter flow from the hopper to the reserve portion of the fluid tank.

Fig. VIII is a transverse section of a modified tank and hopper combination wherein the hopper is pivoted for lateral as well as longitudinal movements.

Figure IX is a fragmentary section on the line IX—IX of Figure VIII showing how the three fluid lines are carried through the transverse hopper pivot.

As shown on the drawings:

While my invention, in its broader aspects, relates to assuring the supply of a fluid from a supply tank, regardless of changes in position of the tank due to rolling, pitching or other motions of the supporting structure therefor, I have chosen to illustrate and describe an embodiment thereof particularly adapted for use in a lubricant circulating and cooling system for engines of an airplane or the like, wherein a continuous supply of oil is necessary for the engine, regardless of acrobatic or fighting maneuvers of the airplane.

As diagrammatically illustrated in Fig. I, an engine lubricating system may include supply and return oil pumps 10 driven from an engine 11, the scavenging part of the pump being of greater capacity than the supply portion in the case of a dry sump engine lubricating system and consequently drawing considerable quantities of air along with the oil, which mixture of air and oil is delivered through a pipe 12 to an oil cooling radiator 13. The radiator is preferably equipped with a bypass or viscosity valve 14 to facilitate initial warming up the oil, but this item forms no part of my invention. From the radiator 13 a pipe 15 conducts the oil and air mixture to one of two hopper trunnions 16 and 17 in the center of the heads 18 and 19 of a drum like oil reservoir or tank 20. Oil from the radiator emerges through a separate passage in the same trunnion 16 and is delivered through a pipe 21 to the return part of the oil pump 10, whence it is distributed to the wearing parts of the engine. The air separated from the oil entering the tank 20 may be vented from a connection 22 at the top of the tank and led by a pipe 23 to the engine; or the tank may be vented through one of the hopper trunnions, as will be described in connection with the modification of Fig. VIII.

The drum-like tank 20, as shown in Fig. II, may conveniently be formed as a substantially cylindrical shell of a depth sufficient to contain a tube-like hopper 24 supported by the trunnions 16 and 17, the rear or left closure or head 18 being a fixed part of the tank shell, while the other or front head 19 is removable and carries the trunnion 16 having the supply and return pipe connections leading into the hopper. It will be noted in Figure I that portions of the tank shell are flattened, a feature dictated by installation clearances in connection with the airplane layout from which this diagrammatic sketch was made.

A filler neck 25 is arranged below the top of the tank to prevent overfilling and to reserve an expansion space therein. A tank drain fitting 26 is also indicated at the bottom of the tank.

The hopper 24 serves the dual purpose of recirculating an initial volume of oil to facilitate the rapid warming up of the engine, and to separate air from the oil. To this end the return oil pipe 15 from the engine connects to an annular passage 27 in the trunnion 16, which passage connects with a passage 28 leading to the top of the hopper, where a guiding passage 29 sets up a circular motion in the oil, producing a swirling vortex in the descending column of oil which centrifuges the oil, releasing the air in the center of the vortex. At its lower end the otherwise cylindrical hopper 24 is slightly narrowed, terminating in a peripheral collecting ring 30 having a passage 31 leading up the wall of the hopper to a central passage 32 in the trunnion 16 which connects with the engine oil supply pipe 21. The incoming oil in the annular passage 27 in the trunnion seals and lubricates the trunnion joint, so that air leakage into the central passage 32 is prevented, the engine drawing de-aerated oil through this passage from around the bottom periphery of the hopper. A tube member 33, extending upwardly into the bottom of the hopper, serves to prevent recirculating or surging flow in and out of the bottom of the hopper into the surrounding volume of make-up oil in the tank 20, especially when the oil level in the hopper has dropped as the engine uses up the circulating oil. Make-up or replenishing oil flow into the hopper is through a central hole in a bottom plate 35, upwardly through the tube 33 to a point above the lower edge of the hopper. The bottom plate 35 also serves as a balance weight holding the hopper upright. When the engine is circulating oil, the oil in the hopper will normally be warmer and lighter than the reserve oil in the main tank outside the hopper, so that the fluid level will be higher in the hopper. As the oil is consumed and the level thereof drops in the hopper, makeup oil will flow inwardly through the tube 33 to maintain a balance. As the reserve oil level falls, the hopper oil level will also decrease.

If desired, a check valve may be provided to prevent back flow, during violent maneuvers, from the hopper to the reserve oil compartment, as shown in Fig. VII. In this figure, a cone-like member 34 is extended upwardly into the bottom of the hopper and serves to occupy the central vortex in the lower part of the swirling column of oil, the cone being apertured at 36 for makeup oil flow. A centrally apertured flexible diaphragm 37 is held in place by the bottom plate 35, and a valve seat 38 for the diaphragm aperture is supported in spaced relationship in the central hole in the plate 35. With this arrangement it would require a slight pressure head on the reserve oil to initiate or maintain makeup flow into the hopper, and in the event of excess pressure, as from centrifugal force, the oil will not be forced out of the hopper.

The problem of de-aerating the return oil entering the hopper can be attacked in several ways, as shown in Figs. IV, V, and VI, the first two being fragmentary sectional elevations involving the top of the hopper, while the last is a transverse section near the top of the hopper. Fig. IV embodies a centrifuge driven by the inflowing oil, a funnel-like member 39 having a series of riffles 40 on its inner surface with holes 41 associated therewith to divert dirt into a pocket 42, the funnel being mounted at 43 for free rotation on the end of a central pipe 44 in communication with the passage 28 on the side of the hopper 24. The throat of the funnel is variably restricted by a spring mounted taper plug 45 having a series of inclined vanes or spirals defining oil passages 46, the oil passing therethrough being given a swirling motion that tends to rotate the funnel on its bearings on the central pipe. The spring mounting of the plug 45 makes provision for varying volumes of oil flow under different engine operating conditions, and by imposing a slight back pressure on the oil sets up a jet effect in the passages 46 accelerating the oil flow and increasing its propulsive effect on the funnel. The oil thus flowing upwardly and outwardly over the riffles eventually flows over the top edge of the funnel into the hopper, which is provided with an overhanging lip 47 to prevent the escape of the oil over the top of the hopper. This arrangement provides for both dirt and air separation from the oil prior to its entry into the hopper.

Fig. V illustrates another method of separating the air from the oil, comprising an annular manifold 48 positioned at the top of the hopper 24 and fed by the passage 28. A series of ports 49 in the hopper wall admit oil between inclined vanes 50 in the space between the hopper wall and a spaced tube 51. Both the hopper wall and the tube 51 have louvres 52 struck towards each other, which louvres direct the oil downwardly into the hopper below the tube 51, while allowing entrained air to escape upwardly into inner and outer air chambers 53 and 54, whence the air escapes at the top of the hopper. With this arrangement the oil is given a swirling motion by the vanes 50, and the louvres are preferably struck at right angles to the vanes, the oil cascading down over the louvres to permit entrained air to readily escape therefrom.

Because of the wide variations in oil flow under different operating conditions, a fixed outlet area into the hopper as shown in Fig. II may under some conditions fail to direct the oil flow with sufficient force to set up a swirling or centrifuging action to assist in releasing entrained air from the oil. One method that may be used to increase or maintain the swirling action in the oil at reduced volumes of flow is shown in Fig. VI, where a semi-circular manifold 55 on the hopper is fed by the passage 28, outlets 56 to the interior of the hopper being covered by light spring-like flaps 57 intended to create a slight back pressure sufficient to direct the flow of oil, the spring-like flaps opening up the outlet passages 56 in proportion to the volume of oil flow, thus assuming the desired centrifugal, swirling, or vortex-like flow of oil down the walls of the hopper.

During the normal operation of an airplane equipped with a fluid circulating system embodying the pivoted hopper of this invention, the hopper will stand vertically throughout climbing and diving maneuvers, due both to its pendulum effect and to the proportionately greater weight and volume of oil in the lower part thereof, the empty hopper being initially balanced to stand upright in its pivots. Acrobatic or fighting maneuvers may impose forces in any direction several times that of gravity, which forces act on the oil in the reservoir surrounding the hopper and may suddenly shift the body of oil from side to side or from bottom to top. In order to assure that the hopper will follow the oil, rather than stand balanced in unstable equilibrium when the oil shifts axially thereof, a baffle 58 may be applied to one or both sides of the hopper, the latter arrangement being shown in Fig. VIII yet to be described. Ordinarily the baffle will be submerged in the reserve oil so that any movement thereof will affect the hopper and tend to move the same with the body of oil to maintain the lower end of the hopper submerged therein.

The modified form of hopper and tank construction shown in Fig. VIII includes a substantially spherical shell 59 having a hopper 60 mounted for free rotation about an axis transverse to the airplane, the hopper being supported for inclination about an internally passaged pivot held together by a bolt 61 at right angles to a transverse passaged shaft 62 mounted for rotation in trunnions 63 and 64 in the shell 59. One trunnion 63 provides for a vent connection 65 and an oil return connection 66, a continuation 65ª the vent connection 65 passing through the shaft 62 and pivot to a pipe 67 extending up the center of the hopper to a point near the upper end thereof. The oil return connection from the engine or radiator similarly passes through the connection 66 in the shaft 62 to a passage 66ª about the pivot bolt 61, and discharges through a pipe 68 mounted on the wall of hopper, which pipe 68 corresponds to the passage 28 described in connection with the hopper 24. Oil is supplied to the engine through a connection 69 at the other trunnion 64, which communicates through a passage 69ª in the shaft 62 and around the pivot 61 to a central pipe 70 extending downwardly to a position adjacent the bottom of the hopper 60 which may be necked in at this point and provided with a central makeup opening 71 to admit reservoir oil to the hopper. It will be understood that the shell 59 and the trunnion connections 65, 66 and 69 are fixed relative to the airplane structure, but for convenience in visualizing the operation, wherein the hopper remains aligned to the predominating gravity, acceleration or centrifugal forces, the shell may be considered for pitch and roll about the vertical hopper; sidewise inclinations of the airplane, within the limits of the range of tilting movements of the shaft 62 relative to the hopper 60, maintaining full availability of the reserve or makeup oil in the shell outside the hopper. Thus the reliability of the oil circulating system during maneuvers is not reduced as the reserve oil is used up, as would be the case with a fixed tank and hopper combination.

The use of the hopper of this invention assures the continuous supply of an adequate volume of oil to the engine during acrobatic or fighting maneuvers until the practical depletion of the reserve oil supply. With a fixed hopper system it would be dangerous to attempt extended maneuvers of this character with a low oil reserve since any departure from level flight conditions might uncover the lower end of the hopper.

Having thus described my invention and the present preferred embodiments thereof, I desire to emphasize the fact that many modifications may be resorted to in a manner limited only by a just interpretation of the following claims.

I claim as my invention:

1. In a fluid circulating system for airplanes wherein a body of fluid is recirculated and reserve fluid supplied thereto as the circulating fluid is depleted, a reserve fluid tank of generally circular section in a plane parallel to the axis of the airplane, a hopper in said tank through which the fluid is adapted to be circulated, means for pivotally mounting said hopper within said tank, including trunnions having a central transverse axis relative to said tank, and fluid circulating connections to and from said trunnions, including passages in said trunnions and associated with said hopper, whereby to deliver the fluid to the top thereof and withdraw fluid from the bottom thereof.

2. In a fluid circulating system for airplanes wherein a body of fluid is recirculated and reserve fluid supplied thereto as the circulating fluid is depleted, a reserve fluid tank of generally circular section in a plane parallel to the axis of the airplane, a hopper in said tank through which the fluid is adapted to be circulated, means for pivotally mounting said hopper within said tank, including trunnions having a central transverse axis relative to said tank, fluid circulating connections to and from said trunnions, including passages in said trunnions and associated with said hopper, whereby to deliver the fluid to the top thereof and withdraw fluid from the bottom thereof, and means for replenishing the circulating fluid in said hopper from the reserve fluid in the tank, including a check valve for preventing back flow from the hopper to the reserve fluid tank.

3. In a fluid circulating system for airplanes wherein a body of fluid is recirculated and reserve fluid supplied thereto as the circulating fluid is depleted, a reserve fluid tank of generally circular section in a plane parallel to the axis of the airplane, a hopper in said tank through which the fluid is adapted to be circulated, means for pivotally mounting said hopper within said tank, including trunnions having a central transverse axis relative to said tank, fluid circulating connections to and from said trunnions, including passages in said trunnions and associated with said hopper, whereby to deliver the fluid to the top thereof and withdraw fluid from the bottom thereof, and means for replenishing the circulating fluid in said hopper from the reserve fluid in the tank.

4. In a fluid circulating system for airplanes wherein a body of fluid is recirculated and reserve fluid supplied thereto as the circulating fluid is depleted, a reserve fluid tank of generally circular section in a plane parallel to the axis of the airplane, a hopper in said tank through which the fluid is adapted to be circulated, means for pivotally mounting said hopper within said tank, including trunnions having a central transverse axis relative to said tank, fluid circulating connections to and from said trunnions, including passages in said trunnions and associated with said hopper, whereby to deliver the fluid to the top thereof and withdraw fluid from the bottom thereof, and means associated with said hopper adapted to separate air from the circulating fluid during its passage through said hopper.

5. In a fluid circulating system for airplanes a reserve tank of generally circular section in a plane parallel to the axis of the airplane, oppositely disposed trunnions defining a central transverse axis, an open topped hopper pivotally mounted in said trunnions and balanced to align with the pull of gravity or centrifugal forces whereby the lower end of said hopper is adapted to be submerged in fluid in said tank and to move with said fluid as the latter responds to the pull of gravity or centrifugal forces during airplane maneuvers and return and draw off connections to said tank and extending through said trunnions to the upper and lower ends of said hopper.

6. In a fluid circulating system for airplanes a reserve tank of generally circular section in a plane parallel to the axis of the airplane, oppositely disposed trunnions defining a central transverse axis, an open topped hopper pivotally mounted in said trunnions balanced to align with the pull of gravity or centrifugal forces whereby the lower end of said hopper is adapted to be submerged in fluid in said tank and to move with said fluid as the latter responds to the pull of gravity or centrifugal forces during airplane maneuvers, means providing supply and return connections to said hopper and means associated with the return connection to the upper end of the hopper so constructed and arranged as to set up a swirling motion of the fluid entering the hopper whereby to facilitate the liberation of air entrained therein.

7. In a fluid circulating system for airplanes a reserve tank of generally circular section in a plane parallel to the axis of the airplane, oppositely disposed trunnions defining a central transverse axis, an open topped hopper pivotally mounted in said trunnions balanced to align with the pull of gravity or centrifugal forces whereby the lower end of said hopper is adapted to be submerged in fluid in said tank and to move with said fluid as the latter responds to the pull of gravity or centrifugal forces during airplane maneuvers, an oil return connection leading from said engine to said hopper, and means associated with the return connection to the upper end of the hopper so constructed and arranged as to distribute and direct the incoming fluid flow tangentially relative to the walls of said hopper.

8. In a fluid circulating system for airplanes a reserve tank of generally circular section in a plane parallel to the axis of the airplane, oppositely disposed trunnions defining a central transverse axis, an open topped hopper pivotally mounted in said trunnions balanced to align with the pull of gravity or centrifugal forces whereby the lower end of said hopper is adapted to be submerged in fluid in said tank and to move with said fluid as the latter responds to the pull of gravity or centrifugal forces during airplane maneuvers, means providing supply and return connections to said hopper, a make-up connection from the reserve tank to the supply connection, and means associated with the return connection to the upper end of the hopper so constructed and arranged as to separate entrained gases from the fluid as it enters the hopper.

9. A lubricating system for airplane engines comprising a reserve oil tank having supply and return oil connections to and from the engine, a tubular hopper pivotally mounted in said tank for balancing movement about an axis transverse to the airplane, and passaged trunnions associated with opposite walls of the tank for rotatively supporting said hopper and to lead said supply and return oil connections to said hopper for circulation therethrough in separated relationship to the reserve oil in said tank.

10. A lubricating system for airplane engines comprising a reserve oil tank having supply and return oil connections to and from the engine, a tubular hopper pivotally mounted in said tank for balancing movement about an axis transverse to the airplane, passaged trunnions associated with opposite walls of the tank for rotatively supporting said hopper and to lead said supply and return oil connections to said hopper for circulation therethrough in separated relationship to the reserve oil in said tank, and a check valve associated with said hopper adjacent said supply connection thereto whereby to feed reserve oil into the hopper to replenish the circulating oil supply.

11. A lubricating system for airplane engines comprising a reserve oil tank having supply and return oil connections to and from the engine, a tubular hopper pivotally mounted in said tank for balancing movement about an axis transverse to the airplane, passaged trunnions associated with opposite walls of the tank for rotatively supporting said hopper and to lead said supply and return oil connections to said hopper for circulation therethrough in separated relationship to the reserve oil in said tank, and means associated with said hopper adjacent the hopper outlet to said supply connection whereby to feed reserve oil into the hopper to replenish the circulating oil supply.

12. A lubricating system for airplane engines comprising a reserve oil tank having supply and return oil connections to and from the engine, a tubular hopper pivotally mounted in said tank for balancing movement about an axis transverse to the airplane, passaged trunnions associated with opposite walls of the tank for rotatively supporting said hopper and to lead said supply and return oil connections to said hopper for circulation therethrough in separated relationship to the reserve oil in said tank, and means associated with said hopper so constructed and arranged as to create a centrifugal oil flow therethrough.

13. A lubricating system for an airplane engine including a reserve oil tank having supply and return oil connections to and from the engine, and means defining a recirculating path within said tank and substantially isolated from the body of reserve oil therein, comprising a pivotally mounted tube balanced to stand normal to the reserve oil level in said tank as determined by the predominant gravitational and/or centrifugal forces acting on said oil body during flight maneuvers, and means connecting said supply and return oil connections to the tube defining the recirculating path within said tank.

14. A lubricating system for an airplane engine including a reserve oil tank having supply and return oil connections to and from the engine, and means defining a recirculating path within said tank and substantially isolated from the body of reserve oil therein, comprising a pivotally mounted tube balanced to stand normal to the reserve oil level in said tank as determined by the predominant gravitational and/or centrifugal forces acting on said oil body during flight manuevers, means connecting said supply and return oil connections to the tube defining the recirculating path within said tank, and means associated with said tube so constructed and arranged as to set up a centrifugal air separating action on the oil passing therethrough.

15. In an airplane engine lubricating system of the recirculating type, a reserve oil tank, a hopper pivotally mounted in said tank and so constructed and arranged as to normally balance in an upright position therein, return and draw-off connections through the hopper pivots to the top and bottom of said hopper respectively, and a makeup connection from the body of the tank to the bottom of the hopper whereby to feed reserve oil into the recirculating lubricant.

16. In an airplane engine lubricating system of the recirculating type, a reserve oil tank, a hopper pivotally mounted in said tank and so constructed and arranged as to normally balance in an upright position therein, return and draw-off connections through the hopper pivots to the top and bottom of said hopper respectively, a makeup connection from the body of the tank to the bottom of the hopper whereby to feed reserve oil into the recirculating lubricant, and a check valve associated with said makeup connection to prevent back flow from said hopper to the reserve oil in said tank.

17. In an airplane engine lubricating system of the recirculating type, a reserve oil tank, a hopper having a gimbal mounting in said tank and so constructed and arranged as to normally balance in an upright position therein, return and draw-off connections though the hopper pivots to the top and bottom of said hopper respectively, and a makeup connection from the body of the tank to the bottom of the hopper whereby to feed reserve oil into the recirculating lubricant.

18. In a recirculating fluid system of the class described including a reserve fluid container and incoming and outgoing fluid connections thereto, a sub-compartment in said container comprising a tubular member open to the interior of said container at both ends, means for supporting said tubular member for rotary motion in said container, said member and its supporting means being so constructed and arranged as to balance the tubular member in an upright position relative to the surface of the surrounding reserve fluid in said container, and means associated with said member and its support arranged to connect said fluid connections to the ends of said tubular member whereby the recirculating fluid is adapted to flow therethrough.

FRANK B. HUNTER.